(12) United States Patent
Luy et al.

(10) Patent No.: US 8,505,834 B2
(45) Date of Patent: Aug. 13, 2013

(54) SPRAY NOZZLE FOR FLUIDIZED BED DEVICE

(75) Inventors: Bernhard Luy, Sulzburg (DE); Manfred Struschka, Auggen (DE); Matthias Tondar, Hausen I.W. (DE)

(73) Assignee: Glatt GmbH, Binzen (DE)

( * ) Notice: Subject to any disclaimer, the term of this patent is extended or adjusted under 35 U.S.C. 154(b) by 803 days.

(21) Appl. No.: 11/918,643

(22) PCT Filed: Apr. 21, 2006

(86) PCT No.: PCT/DE2006/000743
§ 371 (c)(1), (2), (4) Date: Jan. 14, 2009

(87) PCT Pub. No.: WO2006/111161
PCT Pub. Date: Oct. 26, 2006

(65) Prior Publication Data
US 2009/0218419 A1    Sep. 3, 2009

(30) Foreign Application Priority Data

Apr. 21, 2005  (DE) .................. 10 2005 019 444

(51) Int. Cl.
*B05B 7/06* (2006.01)
*B05B 7/10* (2006.01)
*B05B 15/06* (2006.01)

(52) U.S. Cl.
USPC ........... 239/424; 239/104; 239/405; 239/406; 239/420

(58) Field of Classification Search
USPC ............ 239/424, 8, 403, 104, 113–118, 290, 239/398, 399, 405, 406, 418, 420, 423, 451, 456–458, 460, 588; 427/213, 2.15; 118/300, 118/303
See application file for complete search history.

(56) References Cited

U.S. PATENT DOCUMENTS

| 932,739 | A | * | 8/1909 | Wise .............................. 239/424 |
| 2,593,096 | A | * | 4/1952 | Brusdal ......................... 239/424 |
| 3,330,541 | A | * | 7/1967 | Jackson ....................... 261/23.2 |
| 4,036,434 | A | * | 7/1977 | Anderson et al. ................. 239/8 |
| 4,284,242 | A | | 8/1981 | Randell |
| 4,422,900 | A | | 12/1983 | Bordelon et al. |

(Continued)

FOREIGN PATENT DOCUMENTS

| DE | 611325 | 4/1935 |
| DE | 29714564 U1 | 11/1997 |

(Continued)

*Primary Examiner* — Darren W Gorman
(74) *Attorney, Agent, or Firm* — Jacobson Holman PLLC

(57) ABSTRACT

The invention concerns a spray nozzle for a fluidized bed device, said nozzle comprising a central liquid outlet (15) for a liquid coating agent and an annular air outlet (17) for conveying spraying air coaxially. An enclosing body (1) having a central recess (4) is maintained in a wall of the box of the fluidized bed device. Said enclosing body (1) is connected to a spraying air source through an air duct (6) and an axially mobile nozzle head (14) is centrally mounted inside said enclosing body (1). Said nozzle head (14) is connected to a liquid coating agent source through a liquid duct (10), said liquid duct (10) having a flexible tubular section (12) and being centrally guided inside the air duct (6).

4 Claims, 2 Drawing Sheets

(56) References Cited

U.S. PATENT DOCUMENTS

Figure 1:
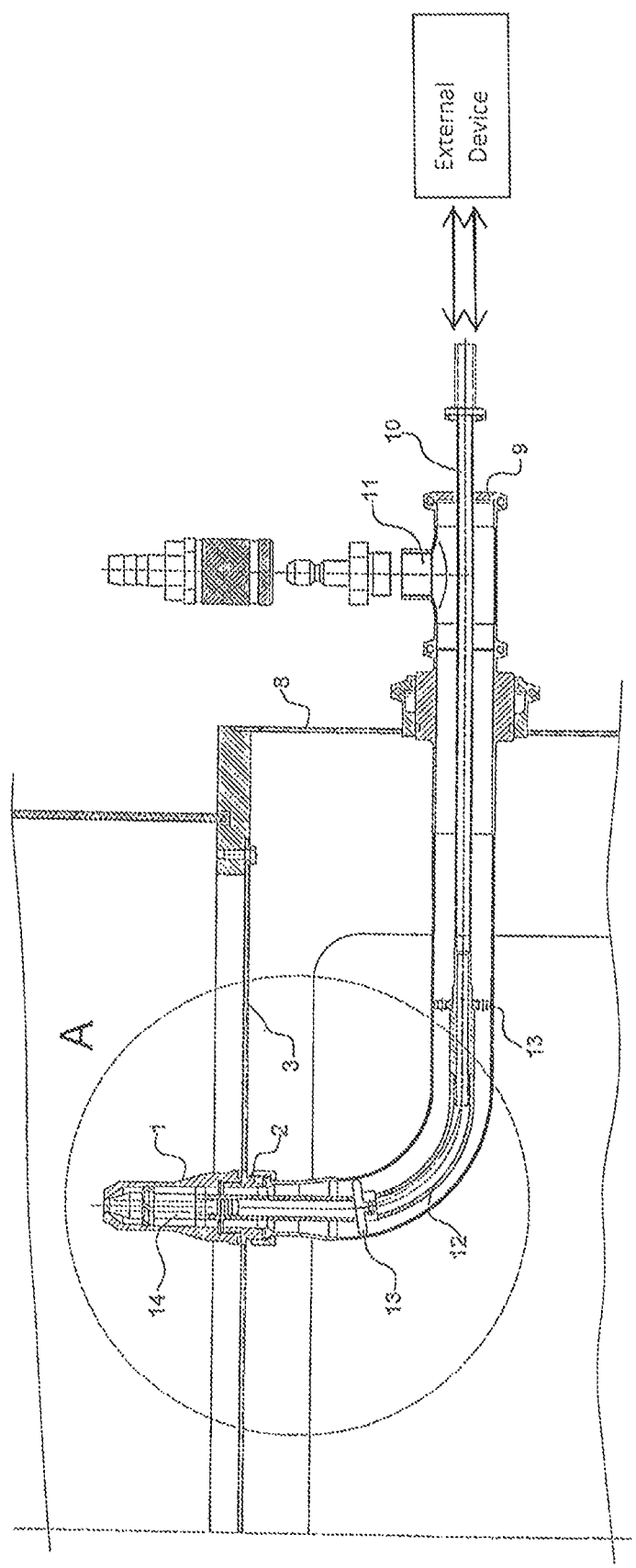

| | | | | |
|---|---|---|---|---|
| 4,619,843 | A | * 10/1986 | Mutsers | 427/213 |
| 4,735,044 | A | * 4/1988 | Richey et al. | 60/742 |
| 4,960,244 | A | * 10/1990 | Maag et al. | 239/424 |
| 5,444,892 | A | 8/1995 | Ris et al. | |
| 6,680,031 | B2 * | 1/2004 | Bisgrove et al. | 422/145 |
| 6,915,638 | B2 * | 7/2005 | Runkle et al. | 60/740 |
| 7,575,182 | B2 * | 8/2009 | Rogers, II | 239/424 |

FOREIGN PATENT DOCUMENTS

| | | |
|---|---|---|
| EP | 0131120 | 1/1985 |
| EP | 0597092 A1 | 12/1990 |
| EP | 057236 | 5/1993 |
| EP | 1064990 A1 | 1/2001 |
| JP | 9019651 | 1/1997 |
| WO | WO2004/087330 A1 | 10/2004 |
| WO | WO2004/101133 A2 | 11/2004 |

* cited by examiner

SPRAY NOZZLE FOR FLUIDIZED BED DEVICE

This is a national stage of PCT/DE06/000743 filed Apr. 21, 2006 and published in German.

TECHNICAL FIELD

The invention relates to a spray nozzle for a fluidized bed device, in particular for coating a pulverulent or granular product in the pharmaceutical or chemical industry. Devices of this type, in practice, are used predominantly for spraying a liquid or flowable active substance onto a pulverulent or granular carrier material or semi-finished product circulating in the fluidized bed device. The spray nozzles may have various installation positions, preferably with a vertical spray direction from the bottom upward, or vice versa. A corresponding method for the granulation of particles is described, for example, in EP 1 064 990 B1.

PRIOR ART

In this context, sensitive and toxic substances are also employed predominantly in the pharmaceutical and chemical industry, thus leading to increased outlay in terms of the cleanliness of the devices. General blockages of the nozzle should be capable of being eliminated without the process being discontinued. It is also expedient to be able to carry out the cleaning of the spray device, without the product having to be emptied out of the process space and fed in again after cleaning has taken place (easier handling). Before a product change, the entire device has to be subjected to thorough cleaning. In addition to other critical components, it is particularly difficult to clean the spray nozzle, with its centric orifice for the coating medium and with the annular orifice for the coaxial supply of the atomizing air.

A further problem is that, in many instances, even during the cleaning of an individual spray nozzle or of a plurality of spray nozzles or of the entire fluidized bed device, a vacuum has to be maintained in the inner space for safety reasons. Consequently, and for safety reasons (pressure-resistant or pressure pulse-resistant design), cleaning orifices in the fluidized bed device while the process is running is possible to only a very limited extent.

According to the prior art, various washing methods and washing devices are known, in which a cleaning fluid is sprayed into the inner space of the fluidized bed device via separate fixed or movable cleaning nozzles and at the same time is sprayed, in particular, onto the critical installation elements EP 0 572 356 B1 indicates a device and a method for the washing of filters in fluidized bed apparatuses and similar process assemblies. In this case, a ring of nozzle orifices is directed centrically onto the filter cartridge.

With regard to the cleaning of a spray nozzle arranged on the bottom of the fluidized bed device, methods have become known in practice in which the entire tubular supply device, including the lines for the coating medium and the atomizing air, is removed from the fluidized bed device downward and laterally outward. The disadvantages here are the considerably outlay in demounting terms and the formation of a relatively large orifice in the wall of the fluidized bed device.

PRESENTATION OF THE INVENTION

The object on which the invention is based is, therefore, to specify a spray nozzle for a fluidized bed device, which spray nozzle can be cleaned by simple technical means, even without an interruption in the swirling process, without the entire spray device having to be removed.

The invention achieves the object by means of the features specified in claim 1. Advantageous developments of the invention are characterized in the subclaims and are illustrated in more detail below together with the description of the preferred version of the invention, including the drawing.

The essence of the invention is that the spray nozzle has an enveloping body which is held fixedly in the wall of the housing of the fluidized bed device and which is connected via an air pipe to an external source for the atomizing air, and an axially displaceable and easily demountable nozzle head is mounted centrically within the enveloping body and is connected via a liquid pipe to an external source for a liquid coating medium.

In what is known as the bottom-spray method (Wurster process), the enveloping body is held preferably in the bottom of the housing of the fluidized bed device. In what is known as the top-spray configuration (classic spray agglomeration), the enveloping body is held in the upper part of the fluidized bed process space. The air pipe leads in each case via a bend laterally out of the fluidized bed device. According to the invention, the liquid pipe has a flexible pipe section and is guided centrically within the air pipe. The nozzle head bears against an axial stop within a centric bore in the enveloping body.

The liquid pipe is mounted axially displaceably in a lock on the air pipe and is connected to an external device for generating an axial force component which presses the nozzle head against the stop via the liquid pipe. Radial supporting rings are present for the mounting of the liquid pipe and of the flexible pipe section in the air pipe.

Within the nozzle head, an axially displaceable cleaning needle may also be present, which is connected to an actuation device. The cleaning needle, in the state of rest, is in a position in which the liquid outlet is released. When this orifice is blocked, the blockage can be pressed out of the nozzle head by means of the axial movement of the cleaning needle. The actuation device may be guided within the liquid pipe in such a way that it can be actuated manually from outside. Solutions are also possible, however, in which the cleaning needle is moved axially within the nozzle head magnetically.

The advantage of the device according to the invention is, in particular, that the device is constructed in a very simple way and can be handled easily and therefore can also be cleaned very easily and quickly. Furthermore, in practice, it may be assumed that, basically, a plant operator is present who must observe the process so that he can also deal with the required elimination of blockages without particular effort.

A further essential advantage is that, after the removal of the abovementioned parts from the air pipe, the fluidized bed device is opened only to the size of the relatively small outside diameter of the nozzle head. According to the prior art, by contrast, a substantially larger orifice arises which corresponds to the outside diameter of an end piece corresponding to the enveloping body, with the risk that, particularly in the bottom-spray variant, particles fall downward out of the fluidized bed device.

The invention is explained in more detail below with reference to an exemplary embodiment. In relation to this, FIG. 1 shows a side view of a spray nozzle according to the invention on the bottom of a fluidized bed device.

Figure 2:
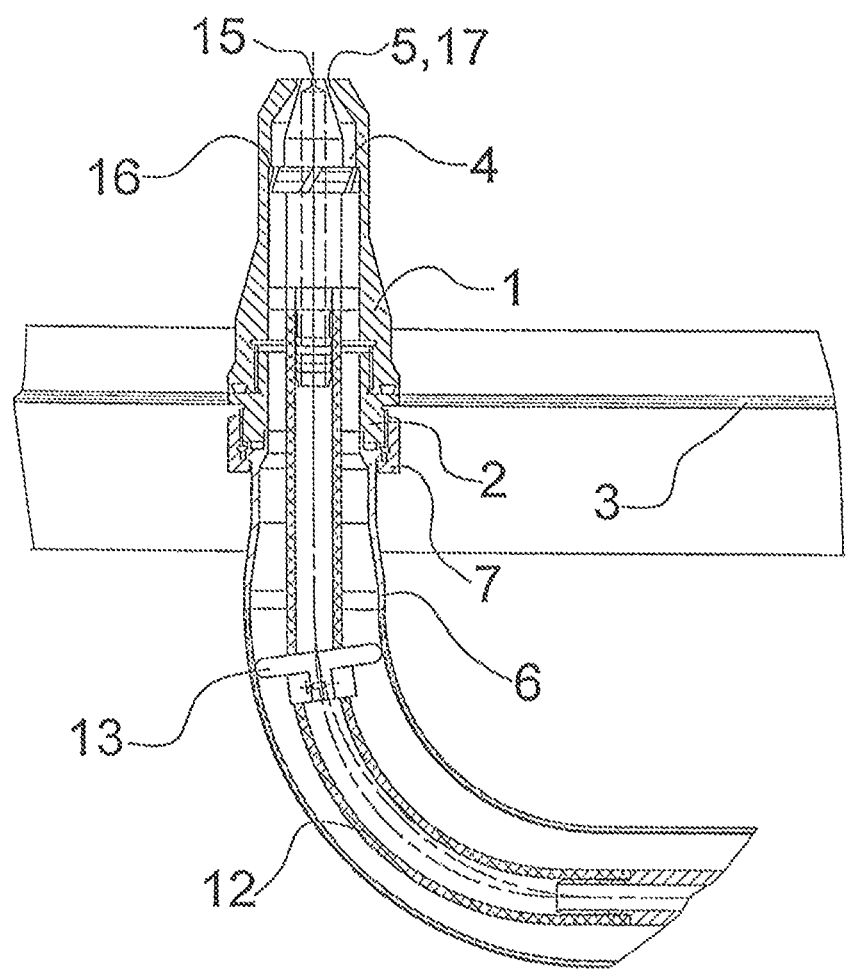

FIG. 2 shows the enlarged detail A in FIG. 1.

EXEMPLARY EMBODIMENT

In the exemplary embodiment, the spray nozzle according to the invention is illustrated on a fluidized bed device for the pharmaceutical industry. As an example, a semi-finished tablet product is to be coated with an active substance component. The active substance component is dissolved in a suspension and because of its specific properties is not to escape into the environment. The entire process therefore takes place within the fluidized bed device under a vacuum, the exhaust gas being subjected to specific cleaning.

The spray nozzle according to the invention consists of an enveloping body 1 which is screwed, pressure-tight, to a basic body 2 on the bottom 3 of the fluidized bed device. In the enveloping body 1, an axial centric bore 4 is provided, which at the upper end has a nozzle-like taper and an air outlet orifice 5.

The bottom 3 of the fluidized bed device is also designated, in practice, as a plenum and comprises the required passages for the supply of the air stream necessary for the fluidized bed method.

An air pipe 6 is fastened to the basic body 2 by means of a capping screw connection 7 and is connected to an external source, not illustrated in the drawing, for the required air stream for spraying a liquid coating medium. The air pipe 6 leads in a bend laterally out of the fluidized bed device. In addition to being held at the capping screw connection 7, the air pipe 6 is mounted, furthermore, in the wall 8 of the fluidized bed device. Outside the fluidized bed device, the air pipe 6 ends at a lock 9 having a bore. A liquid pipe 10, through which the liquid coating medium is supplied, is introduced through the bore into the air pipe 6. The air stream for spraying the liquid into the air pipe 6 is supplied via a connection 11 upstream of the lock 9.

The liquid pipe 10 is designed as a rigid pipe in the region of the lock 9 and in the region in which the air pipe 6 is straight. In the region of a bend of the air pipe 6 in the direction of the capping screw connection 7, the liquid pipe 10 has a flexible pipe section 12 which is held in a centric position within the air pipe 6 by means of supporting rings 13. In the exemplary embodiment, the flexible pipe section 12 is manufactured from a pressure-resistant plastic hose. A nozzle head 14 with a liquid outlet 15 is arranged in the center axis of the enveloping body 1 at the end of the flexible pipe section 12.

The nozzle head 14, in the operating state, bears against a stop 16 in the enveloping body 1 via a force component acting on the liquid pipe 10 from outside, an inherent elasticity of the flexible pipe section 12 being utilized. In this case, the stop 16, the enveloping body 1 and the nozzle head 14 are designed such that an annular air outlet 17 is formed between the air outlet orifice 5 and the upper end of the nozzle head 14 in the drawing.

The use of the spray nozzle will be described in more detail below. In the operating state, the spray nozzle is in the position corresponding to the drawing. To spray the liquid coating medium, first, compressed air is conducted through the air outlet 17 via the connection 11, the air pipe 6 and the bore 4 in the enveloping body 1. Thereafter, the coating medium is conducted to the liquid outlet 15 in the nozzle head 14 via the liquid pipe 10 having the flexible pipe section 12. When the coating medium meets the air stream above the spray nozzle, a spraying of the coating medium in the air stream occurs in a known way.

In the event of a soiling of the air outlet 17 or of the liquid outlet 15 by the pulverulent or granular carrier material circulating in the fluidized bed device, the spray nozzle has to be cleaned. For this purpose, the supply of the coating medium is interrupted, and a retaining device, present if appropriate, is released. The liquid pipe 10 is thereafter drawn out of the orifice of the lock 9. In the case of lighter blockages, it is often sufficient to move the liquid pipe 10 and all the parts connected to it back and forth several times in order to eliminate the blockage. In the case of heavier blockages, the lock 9 has to be released and the liquid pipe 10 together with the flexible pipe section 12, including the supporting rings 13 and the nozzle head 14, are drawn out of the air pipe 6 completely and are subjected to cleaning outside the fluidized bed device.

After cleaning, the liquid pipe 10 with the flexible pipe section 12, including the supporting rings 13 and the nozzle head 14, is pushed into the air pipe 6 again in the opposite direction.

LIST OF REFERENCE SYMBOLS USED

1 Enveloping body
2 Basic body
3 Bottom
4 Bore
5 Air outlet orifice
6 Air pipe
7 Capping screw connection
8 Wall
9 Lock
10 Liquid pipe
11 Connection
12 Flexible pipe section
13 Supporting ring
14 Nozzle head
15 Liquid outlet
16 Stop
17 Air outlet

The invention claimed is:

1. A spray nozzle for a fluidized bed device, said spray nozzle comprising:
    a central liquid outlet for conducting a liquid coating medium therethrough;
    an annular air outlet for conducting a coaxial supply of atomizing air therethrough;
    an enveloping body held in a wall of a housing of the fluidized bed device, said enveloping body having an axial stop and defining a central bore fluidly connected via an air pipe to a source for the atomizing air; and
    an axially displaceable nozzle head mounted centrally within the enveloping body and bearable against said axial stop within the central bore, said nozzle head fluidly connected with a liquid pipe to a source for the liquid coating medium, the liquid pipe having a flexible pipe section and being guided centrally within the air pipe and capable of flexing within said air pipe, said liquid pipe mounted so as to be axially displaceable through a lock secured to the air pipe so that as the liquid pipe is displaced axially, the flexible pipe section is capable of flexing.

2. The spray nozzle as claimed in claim 1, further comprising an external device for generating an axial force component for pressing the nozzle head against said axial stop via displacement of the liquid pipe.

3. The spray nozzle as claimed in claim 1, wherein the liquid pipe and its flexible pipe section are mounted centrally and are axially displaceable in the air pipe through radial supporting rings.

4. The spray nozzle as claimed in claim 1 wherein said air pipe has a bend and said flexible pipe section of said liquid pipe is within the region of the air pipe bend.

\* \* \* \* \*